(12) United States Patent
Ryskamp

(10) Patent No.: US 8,184,789 B2
(45) Date of Patent: *May 22, 2012

(54) APPARATUS, SYSTEM, AND METHOD FOR AUTOMATED CALL INITIATION

(75) Inventor: Rix Alan Ryskamp, Springville, UT (US)

(73) Assignee: Transcend Products, LLC, Springville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/774,663

(22) Filed: May 5, 2010

(65) Prior Publication Data

US 2010/0239082 A1 Sep. 23, 2010

Related U.S. Application Data

(63) Continuation of application No. 12/406,021, filed on Mar. 17, 2009, now Pat. No. 7,734,029.

(51) Int. Cl.
*H04M 3/42* (2006.01)
*H04M 3/00* (2006.01)
*H04M 5/00* (2006.01)

(52) U.S. Cl. .......... 379/201.1; 379/265.01; 379/265.02; 379/265.11

(58) Field of Classification Search .......... 379/265.11, 379/265.01, 201.1, 265.12, 266.08, 265.02, 379/266.07; 705/249
See application file for complete search history.

(56) References Cited

U.S. PATENT DOCUMENTS

2003/0083875 A1* 5/2003 Brown et al. ................ 704/249
* cited by examiner

*Primary Examiner* — Thjuan K Addy
(74) *Attorney, Agent, or Firm* — Matthew D. Thayne; Phillips Ryther & Winchester

(57) ABSTRACT

An apparatus, system, and method for automated call initiation. The method for automated call initiation includes initiating a call to a destination using a first communication line. The method also includes initiating a call status determination that determines when a person answers the call at the destination. Furthermore, the method includes during the call status determination, sending audio information from the destination to an agent. In addition, the method includes assigning the call to the agent, in response to the call status determination determining that the person answered the call at the destination. Therefore, the agent is able to monitor the call and assume a natural response to the person, thus eliminating delay as the conversation begins.

23 Claims, 6 Drawing Sheets

APPARATUS, SYSTEM, AND METHOD FOR AUTOMATED CALL INITIATION

CROSS-REFERENCES TO RELATED APPLICATIONS

This application is a continuation of U.S. patent application Ser. No. 12/406,021 filed on Mar. 17, 2009, entitled "Apparatus, System, and Method for Automated Call Initiation" and for Rix Alan Ryskamp, which is incorporated herein by reference. This application claims priority to U.S. Provisional Patent Application No. 61/069,742 filed on Mar. 17, 2008, entitled "Automated Contact System" and for Rix Alan Ryskamp, which is incorporated herein by reference. This application claims priority to U.S. patent application Ser. No. 12/406,021 filed on Mar. 17, 2009, entitled "Apparatus, System, and Method for Automated Call Initiation" and for Rix Alan Ryskamp.

FIELD OF THE INVENTION

This invention relates to call initiation and more particularly relates to automated call initiation.

BACKGROUND

Description of the Related Art

Contact centers, also known as call centers, typically use automated dialers to increase productivity. These automated dialers (sometimes referred as "predictive dialers" or "power dialers") work on the principle that a dialing system should be calling numbers before an agent is ready for the call in order to have a call ready for the agent when the agent becomes available. When an agent is ready, the call is transferred to the agent. As a result, a called party may have already answered on the other end. This system works well for agent productivity; however, it has several serious disadvantages. The most notable is a delay between when the called party answers the call and issues a greeting, and when the assigned agent replies. This delay and the unnatural human call initiation that accompanies it are caused by the fact that the call was initiated by an automated dialer looking for a live person and not by an actual agent.

Furthermore, automated dialers are also typically implemented using a centralized dialing system that initiates the calls described above and then transfers the calls to user terminals when certain conditions are met. These centralized dialers are traditionally very expensive systems.

SUMMARY

The present invention has been developed to provide an apparatus, system, and method for automated call initiation that achieves the same advantages as traditional automated call initiation systems without the need for an expensive centralized dialer or the processing delays the conventional automated dialer creates.

A method is presented for initiating a call to a destination, initiating a call status determination, during the call status determination, sending audio information from the destination to an agent, and assigning the call to the agent. As used herein, the term "during" means that the particular operation is being performed at the same time as, concurrent with or at substantially the same time as at least one second operation. In relation to the claimed invention, the terms "during," "concurrent with," "simultaneous with," and/or "substantially simultaneous with" refer to the execution of two or more operations within the same period of time. Alternatively, if the two or more operations are not technically executed at the same moment in time but are actually executed in whole or in part in sequence with each other such execution is within such a small period of time that a person interacting with a processing device executing the two or more operations is unable to determine that the two or more operations are actually being performed consecutively in whole or in part.

The method includes initiating a call to a destination using a first communication line. The method also includes initiating a call status determination that determines when a person answers the call at the destination. Furthermore, the method includes during the call status determination, sending audio information from the destination to an agent. In addition, the method includes assigning the call to the agent, in response to the call status determination determining that the person answered the call at the destination.

In one embodiment, the method includes sending audio information from the agent to the person during the call status determination. In another embodiment, the call status determination incorporates a verbal response from the agent in determining that the person answered the call at the destination. In some embodiments, the method also includes sending audio information from the call to two or more agents during the call status determination. The call is assigned to an available agent from the two or more agents.

In one embodiment, the method includes initiating a plurality of calls and initiating a call status determination for each of the plurality of calls. Furthermore, during the call status determination, the method may determine a likelihood for each of the plurality of calls that each call is contacting a person. In addition, during the call status determination, the method may send audio information from a destination of a selected call to an available agent. The selected call is a call with the highest likelihood of contacting a person.

In some embodiments, a user terminal initiates the call. The user terminal may include two or more communication lines and may be operated by an agent. Furthermore, in another embodiment, the user terminal includes an analysis module configured to execute the call status determination.

In one embodiment, the method includes initiating a second call on the user terminal using a second communication line. The method may also transfer the second call to a second user terminal in response to determining that the agent at the first user terminal is unavailable to accept the second call and determining that a second agent operating the second user terminal is available to accept the second call. In another embodiment, the method includes sending terminal call status from the user terminal to a call controller. The call controller receives group information and assigns a plurality of calls to agents for the plurality of user terminals based on the group information. The group information includes terminal call statuses from a plurality of user terminals.

In one embodiment, the method includes broadcasting terminal call status from the user terminal to one or more additional user terminals. The user terminal receives terminal call statuses from the one or more additional user terminals and maintains group information comprising terminal call statuses for each user terminal.

An apparatus is presented for automated call initiation using a predictive dialing algorithm. The apparatus includes an initiation module, an analysis module, an audio monitoring module, and an assignment module. In certain embodiments, the apparatus may also include an audio transmission module, a transferring module, a sending module, a group tracking module, a broadcasting module, and a status receiving module. In addition, the analysis module may include a detection module. The preceding modules may be configured to functionally perform the necessary steps as described above in relation to the method. In one embodiment, the analysis module initiates a Call Progress Analysis ("CPA") that determines that a person answers the call at the destination. Furthermore, the audio monitoring module may send audio information from the destination to an agent concurrent with the CPA. In addition, the audio transmission module may send audio information from the agent to the person concurrent with the CPA.

A system of the present invention is also presented for automated call initiation. The system may be embodied as a network, a call controller, and a user terminal. The user terminal and call controller may comprise modules similar to the modules described above in relation to the apparatus and also configured to functionally perform the necessary steps as described above in relation to the method. In addition, a transferring module of the system and/or apparatus may receive a second call from a second user terminal in response to a determination that the agent at the user terminal is available to accept the second call.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
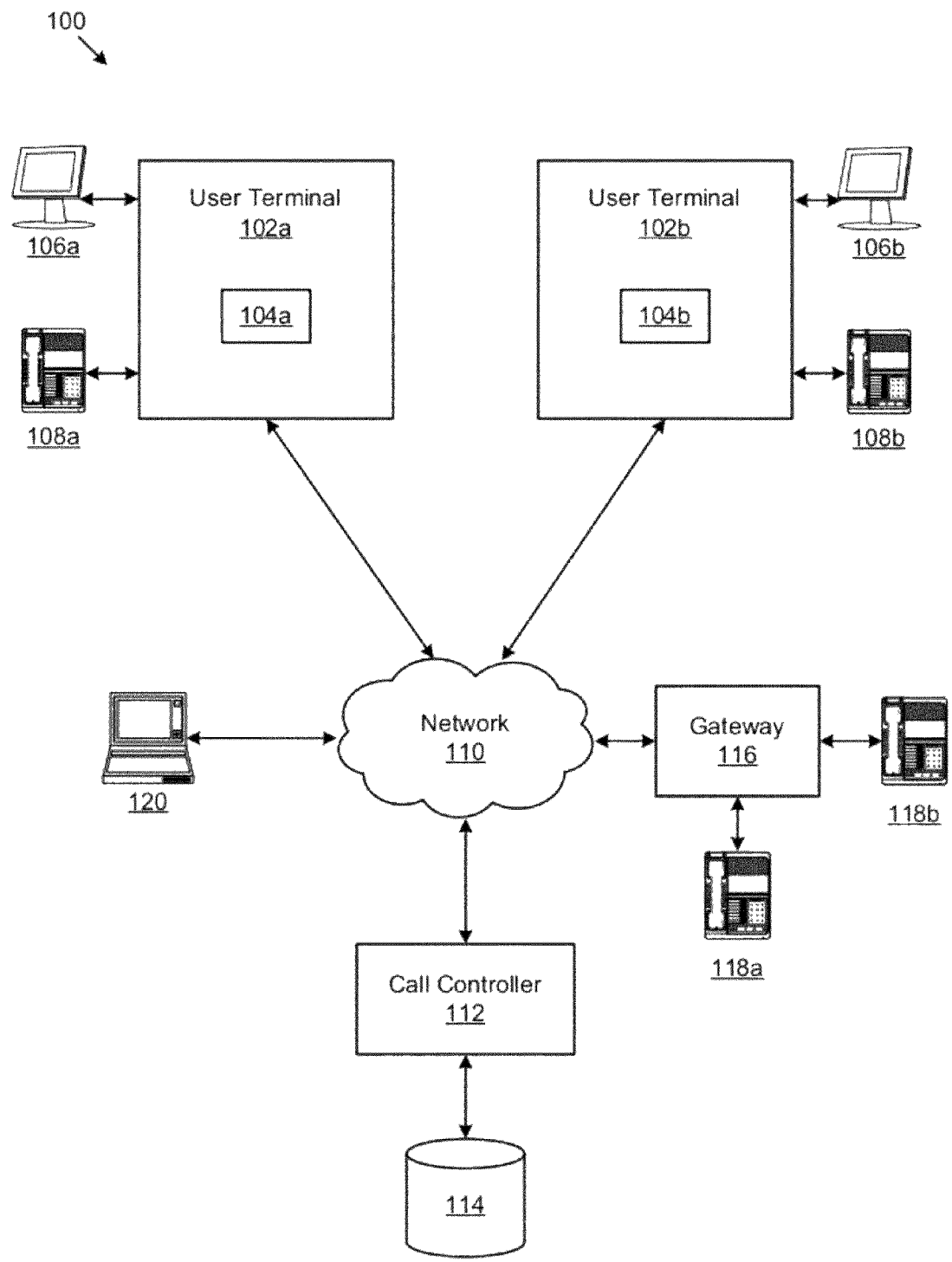
FIG. 1 is a schematic block diagram illustrating one embodiment of a system for automated call initiation.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for automated call initiation. The system 100 includes a first user terminal 102a and an optional second user terminal 102b. Each user terminal 102 may include an automated call apparatus 104, user interface devices 106, and a communications device 108. Furthermore, the system 100 also includes a network 110, an optional call controller 112, data storage device 114, a communications gateway 116, a plurality of destinations 118a-b, and a network destination 120. Those of skill in the art recognize that the system 100 may be simpler or more complex than illustrated, so long as the system 100 includes modules or sub-systems that correspond to those described herein.

As used herein, user terminal 102 is a device used by a person or process to initiate communication such as a call. Although the depicted embodiment shows two user terminals 102a,b, any number of user terminals 102 may be used in the system 100. A user terminal 102 may be a combination of software and hardware or implemented with software or hardware alone. The user terminal 102 may be a personal computer, a laptop computer, a workstation, a computer system, an appliance, an application-specific integrated circuit ("ASIC"), a Personal Digital Assistant ("PDA"), a digital music player, a server, a server blade center, a server farm, a router, a switch, an appliance, a motor, an automotive system, an avionics system, or the like. One of skill in the art will recognize other examples of electronic devices that may serve as the user terminal 102. The user terminal 102 may include a system bus, a processor, a system memory, and one or more memory storage devices Each user terminal 102a is operated by a contact center agent ("agent"). An agent may be a person or automated process. Each user terminal 102 has at least one communication line. In certain embodiments, each user terminal 102 has two or more communication lines and is able to simultaneously process and/or analyze the two or more communication lines.

As used herein, a communication line may be, but is not limited to a physical or virtual controlled media stream or channel such as a traditional telephone line, a Voice-over-Internet-Protocol ("VoIP") line, a Session Initiation Protocol ("SIP") line, a communications socket, a video-conferencing communications socket, and the like.

An agent may initiate calls from the user terminal 102. As used herein, a call may comprise any communication path between two or more parties. A call may comprise an audio communication, a video communication, or an audio and video communication. Furthermore, a call may comprise various forms of media or combinations thereof such as audio, data, text messages, presence information, video, pictures, binary data, and the like. A call may be embodied as a data stream, audio wave, electronic signal, or similar analog or digital media.

The user terminal 102 may initiate a call through any device or software that initiates media communications sessions. In one embodiment, an agent uses a VoIP "soft phone" at the user terminal 102 to initiate and engage in a call. Furthermore, the user terminal 102 may also interface with other systems or software such as a Customer Relationship Management ("CRM") system through an Application Programming Interface ("API") or other interface known in the art. A CRM may track customer information and other contacts. The user terminal 102 may also interface with a payroll management solution or other employee tracking and/or management software.

The user interface devices 106 may comprises devices for communicating to, and receiving communication from, a user as is known in the art. Such devices 106 may include, but are not limited to a computer monitor, a touch screen, a keyboard, a computer mouse, and the like.

The communications device 108, in one embodiment, is a device for the agent to communicate over the communication line and may include any electronic device capable of receiving and transmitting audio or video information operationally coupled to the user terminal 102. In one embodiment, the communications device 108 comprises a VoIP communications device. Advantageously, a less expensive device such as a Universal Serial Bus ("USB") style phone or headset (microphone and speaker) may also be used.

The automated call apparatus 104 enables the user terminals 102a,b to work together in a group or cluster and decentralizes call analysis and call management. In one embodiment, the automated call apparatus 104 implements call initiation using automatic dialing. An automated dialing system automatically initiates a plurality of calls rapidly to maximize the number of outgoing calls from a contact center. An automated dialing system may use a predictive dialing algorithm, or may simply initiate as many calls as possible, connecting up calls with agents when an agent is available. The automated call apparatus 104, in one embodiment, implements automated call initiation with or without a predictive algorithm, or predictive dialing, at the user terminal 102 instead of at a centralized dialing server. Predictive algorithms determine when calls should be initiated to maximize an agent's efficiency. Specifically, a predictive algorithm tracks the progress of a plurality of calls, anticipates when an agent will become available even when the agent is currently occupied with other calls, and assigns a call to an available agent. Predictive or automatic may include any system or mechanism to determine where and when to place a call.

Furthermore, in another embodiment, the automated call apparatus 104 also performs call analysis at the user terminal 102 in connection with the predictive call initiation. This call analysis includes Call Progress Analysis ("CPA") that tracks the disposition of a call, or the stage of the call such as whether the call is ringing, or busy, or answered by a machine, or answered by a person.

In addition, another form of call analysis is Call Management Analysis ("CMA") that determines what action to take with the call such as terminating the call, assigning the call to an agent, and the like. A conventional centralized dialer performs both CPA and CMA. When the centralized dialer determines that a person has answered the call, the centralized dialer assigns and transfers the call to an available agent. The person that answered the call, in the meantime, encounters an unnatural pause during the CPA and CMA. Conventionally, anytime an automatic dialer such as a conventional centralized dialer, initiates a call and performs call analysis, the person that answers the initiated call will hear a pause that may last several seconds as the call is connected to an agent.

The automated call apparatus 104 may initiate the calls and perform the CPA and/or the CMA at the user terminal 102. Besides de-centralizing the automated call initiation and analysis and initiating one or more calls at the user terminal 102, the automated call apparatus 104 sends audio information from the destination called to the agent with a preliminary connection. As used herein, a preliminary connection comprises sending audio information from the call or destination to the agent, and/or sending audio information from the agent to the destination or into the call before the call has been permanently assigned to the agent. This audio information allows the agent to listen to a call while the call is being analyzed. In certain embodiments, the automated call apparatus 104 may send audio information from the agent to the destination called, enabling two-way communication between the agent and the destination called the instant a called person answers. In one embodiment, the automated call apparatus 104, during the call analysis including the CPA and CMA of a plurality of simultaneous calls, may allow an agent to listen to the call most likely to have reached a person. In one example, the call determined to be the most likely to have reached a person may be the call that has been connected to the destination the longest. For example, the automated call apparatus 104 initiates a call and preliminarily connects the call to an agent who hears the last rings followed by the newly called party saying "hello." The agent is able to respond immediately and naturally. By de-centralizing the predictive call initiation and analysis lead to initiating calls from the user terminal 102. In embodiments where the calls are initiated on the user terminal 102, the inventor discovered that the user terminal 102 can send the audio information from a call in progress during the call analysis phase to the agent at the user terminal 102. Optionally, the user terminal 102 can send the audio information from the agent to a destination being called by the agent's own user terminal 102. As a result of sending the audio information from a call in progress during the call analysis phase to the agent at the user terminal 102 the inventor unexpectedly discovered that, the unnatural pause is eliminated when a call connects to a living person.

It should be noted that the sequence of operations in the embodiments of the claimed invention differ markedly from the sequence of operations for conventional automated dialers, and in particular for predictive dialers. In conventional dialers, audio information from a call, including audio information from a person answering the call is sent to an available agent only after a determination is made by that the call has reached a living person. As explained, this sequence of events leads to an unnatural pause which may signal the called person to end the call. In contrast, the sequence of operations of embodiments of the claimed invention send audio information originating from the destination being called to an available agent before and/or during the period of time that the automated call apparatus 104 is determining whether the call is being answered by a person. Consequently, if the automated call apparatus 104 assigns the call to the agent, the agent can answer immediately with a natural response. In certain embodiments, the automated call apparatus 104 may also send audio information originating from the available agent to the called destination before and/or during the period of time that the automated call apparatus 104 is determining if the call is being answered by a person.

Furthermore, in some embodiments, the automated call apparatus 104 may interact with other user terminals 102b directly or through the call controller 112 to transfer or receive transferred calls, thereby ensuring that a call is assigned to an agent if the agent at the user terminal 102a where the call originated is not available.

With the automated call apparatus 104, the system 100 gives a contact center the productivity advantages of automatic and predictive dialing, while eliminating the delay and unnatural call introductions that are associated with automatic dialing and other call initiation devices. These two factors may yield a higher rate of productivity and customer satisfaction for the contact center. Another benefit of the system 100 is the dramatic savings for contact centers, as the system 100 eliminates the need for most of the expensive components associated with automated dialing. For example, consider a contact center using an expensive central dialing server. The central dialer is connected to a traditional long-distance telephone carrier through traditional T1 interfaces. Telephones at the agent's stations are connected using traditional telephone wiring systems connected to a PBX system.

The company may replace all of the above stated devices, except their existing CRM solution, by implementing an embodiment of the system 100 with the automated call apparatus 104. Now a simple system of clustered user terminals 102a,b may communicate directly with each other and with a VoIP-to-PSTN carrier. In addition to replacing expensive dialing hardware, the company may also replace the traditional T1s. This will save the company thousands in monthly fees. In certain embodiments, each agent's user terminal 102 will serve act as a mini-dialer to initiate calls.

Therefore, because the automated call apparatus 104 provides the benefit of automated dialing without the unnatural delays associated with conventional automated dialing, including predictive dialing, the call initiation performed by the system 100 with the automated call apparatus 104 may be termed "natural automated dialing."

The network 110 may comprise a single network, a plurality of networks, a LAN, a plurality of LANs, a localized intranet, the Internet, wireless networks, wireless cellular phone networks, a localized intranet in communication with the Internet, and the like.

The call controller 112 is in communication with the network. The call controller 112, in one embodiment, coordinates call initiation at the user terminals 102 and tracks the call status of each line on the user terminal 102. The call controller 112 may transfer a call or instruct a user terminal 102a to transfer a call from one user terminal 102a to another user terminal 102b. Furthermore, the call controller 112 may also maintain a directory with information for each user terminal 102 such as storing IP addresses of active user terminals 102 in a group. In some embodiments, the call controller 112 uses a simple messaging system such as Extended Markup Language ("XML") over an HTTP based messaging protocol, to stay in constant communications with user terminals 102.

The call controller 112 may execute on a personal computer, a laptop computer, a workstation, a computer system, an appliance, an application-specific integrated circuit ("ASIC"), a Personal Digital Assistant ("PDA"), a digital music player, a server, a server blade center, a server farm, a router, a switch, an appliance, a motor, an automotive system, an avionics system, or the like. One of skill in the art will recognize other examples of electronic devices that may serve as the call controller 112. The call controller 112 may include a system bus, a processor, a system memory, and one or more memory devices.

In one embodiment, the call controller 112 comprises a centralized dialer that performs automated and/or predictive dialing at the call controller 112. For example, a contact center that has invested heavily in centralized equipment may prefer a hybrid solution such as initiating the calls from the centralized dialer but allowing an agent at a user terminal 102 to hear audio from the call while the centralized dialer analyzes the call.

Furthermore, in one embodiment, the data storage device 114 is in communication with the call controller 112 and stores the directory of user terminal information used by the call controller 112 to monitor the status of each user terminal 102a. The data storage device 114 may comprise a relational database implemented on computer readable storage medium.

Although the system 100 depicts a call controller 112, the system 100 may also be embodied without a call controller 112. Specifically, in such an embodiment, all communication occurs between the user terminals 102a,b using peer-to-peer or other collaborative communications functionality. For example, a user terminal 102a may communicate directly with another user terminal 102b to transfer a call or to receive a transferred call. Furthermore, each user terminal 102 may store group information, or information on the status of the calls on all user terminals 102 as described below.

The communications gateway 116 allows the user terminals 102a,b to connect to non-native network types such as the Public Switched Telephone Network ("PSTN") or the cellular network. The plurality of destinations 118a,b may include telephones on non-native networks such as the PSTN or the cellular network. As used herein, a destination 118 comprises an entity, device, or person that receives communication and is reachable by an address or reference. Therefore, a destination 118 may be the telephones connected to the line reachable by a particular telephone number, the VoIP device identifiable by a username and/or Uniform Resource Identifier (URI), Internet address, and the like. One of ordinary skill in the art realizes that a destination 118 may comprise the receiver of communication over numerous communication protocols.

The network destination 120 may include VoIP devices and other devices in communication with the network 110 through protocols such as URI-to-URI communications, Pure SIP communications, Peer-to-Peer communications, End-to-End communications, and the like. In this manner, a media communications session may be made directly between two systems on a network 110 such as the Internet, or between a combination of networks such as the Internet and a wide area network, without the need for a paid intermediary such as a phone company.

Figure 2:
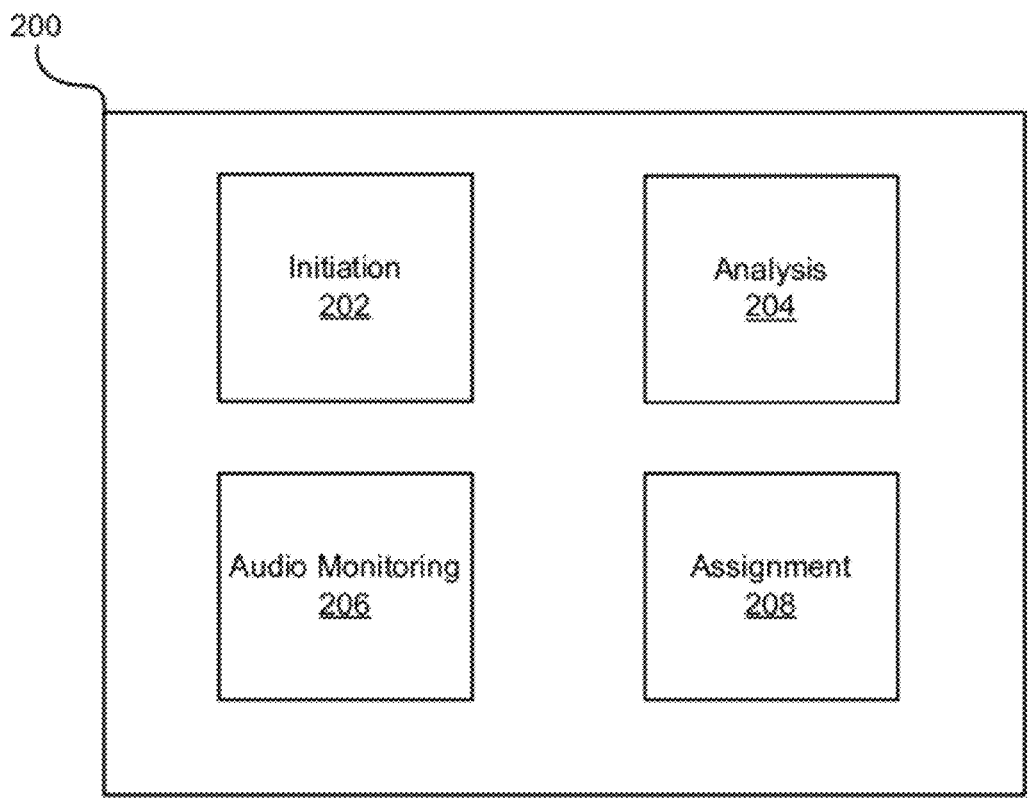
FIG. 2 is a schematic block diagram illustrating one embodiment of an apparatus for automated call initiation

FIG. 2 depicts one embodiment of an apparatus 200 for automated call initiation. The apparatus 200 comprises one embodiment of the automated call apparatus 104a depicted in FIG. 1. The apparatus 200 in the pictured embodiment of FIG. 2 includes an initiation module 202, an analysis module 204, an audio monitoring module 206, and an assignment module 208.

The initiation module 202 initiates a call to a destination 118 using a first communication line. Initiating a call may comprise transmitting a data stream from a source to a destination 118 such as placing a telephone call or transmitting a video, audio, a call initiation signal, or other media stream across the network or across the network and through the gateway to another communications protocol. The initiation module 202 may initiate a call by dialing a phone number, beginning a session, or referencing a variety of communication addresses including a PSTN phone number, an Internet Uniform Resource Identifier ("URI"), an Internet IP Address, a Skype name, and the like.

Initiating a call may also comprise connecting a user terminal 102 or central dialer to the media stream and may include connecting a telephone call to a phone, connecting a video stream to a display, connecting an audio stream to a microphone and speakers, and connecting a media stream to external devices for additional processing.

The initiation module 202 may initiate a plurality of calls sequentially or simultaneously. In certain embodiments, the initiation module 202 simultaneously initiates calls on and maintains at least two lines at each user terminal 102. This enables the automated and/or predictive capability yielded by having multiple lines per agent. Therefore, in one embodiment the initiation module 202 resides on a user terminal 102 and calls are actually initiated at the terminal 102 instead of at a centralized dialer. In one embodiment, the initiation module 202 runs a predictive dialing algorithm at the user terminal 102 to determine what destinations 118,120 to call, the timing of the calls to ensure that an agent is available, and the like.

In another embodiment, the initiation module 202 send requests from the user terminal 102 to the call controller 112 that include the current line statuses, call progress statuses, and other information for the user terminal 102. The call controller 112 replies with a phone number or destination address to begin calling on an unused line. The call controller 112 may delay the reply if the call controller 112 determines that a call is not appropriate at that time. In this embodiment, the predictive dialing algorithm may reside on the centralized call controller 112 and may determine call initiation requests for each user terminal 102. However, in this embodiment, even if the predictive dialing algorithm is implemented at the call controller 112, the predictive dialing algorithm interacts with each user terminal 102 separately, since calls may be initiated by the user terminals 102 individually and not initiated by a centralized server and then transferred to the user terminals 102 after the calls are connected.

In another embodiment, the initiation module 202 resides on a centralized device such as the call controller 112, or a conventional centralized dialer. In this embodiment, calls are initiated from a centralized location and not at the user terminal 102.

The analysis module 204 initiates a call status determination that determines when a person answers the call at the destination 118. In another embodiment, the analysis module determines that a person answers the call at the destination 118. The analysis module 204 may initiate a call status determination for a plurality of calls in sequence or simultaneously. In one embodiment, the call status determination comprises an automated or automatic process performed by a computer or electronic processor in cooperation with a memory device to determine the status of one or more calls. In certain embodiments, the call status determination comprises a set of machine executable instructions configured for automatic execution by an electronic processor in cooperation with a memory device, such as in a computer. The call status determination may comprise the CPA process as described above. Specifically, in one embodiment, the CPA process comprises mechanisms for tone detection, signaling detection, voice detection, and the like. Therefore, the call status determination may analyze the audio of the call to determine the status of the call. Ring, busy, in-progress, answered by machine, answered by a person, and, no answer, are examples of different possible call statuses. The call status specifics may be different according to the various communication protocols. The analysis module 204 may also parse SIP signaling text or any other media specific call signaling mechanism to determine the state of the call.

In one embodiment, the analysis module 204 may determine that a person answered the call at the destination 118 through the call status determination. The analysis module 204 may use audio analysis to determine that a person answered the call. Furthermore, in certain embodiments, the call status determination may incorporate a verbal response from the agent in determining whether a person answered the call at the destination 118. As will be described in more detail hereafter, the agent may monitor and interact with the call as the analysis module 204 is analyzing the call. Therefore, if an agent hears a person answer the call and the person answering says "hello" and the agent answers with a greeting of his/her own, the call status determination may incorporate the verbal response from the agent such that the analysis module 204 determines whether a live person answered the phone.

The analysis module 204 may also perform all or a subset of the CMA functions as described above. Specifically, the analysis module 204 may monitor the state of the call status determination, the state of the user agent, the state of other user agents, and information from the destination 118 of the call to determine when a call should be preliminarily connected with an agent during analysis as will described hereafter. The analysis module 204 may also determine when to disconnect the call from the call status determination, and which call to assign to the agent.

In one embodiment, the analysis module 204 resides on each user terminal 102. Therefore, the analysis module 204 may analyze the calls that are initiated at the user terminal 102. In another embodiment, the analysis module 204 resides on a centralized device such as the call controller 112, or a conventional centralized dialer. In this embodiment, calls are analyzed from a centralized location and not at the user terminal 102.

The audio monitoring module 206 sends audio information from the destination 118 to an agent during or concurrent with the call status determination. In one embodiment, audio information comprises audio signals and/or data such as human voice signals transmitted from the call, originating from the call, included as part of the call, and/or transmitted from the destination through the call. The audio information may include audio ring signals, audio tones, and audio input signals from a person answering the call at the destination. Furthermore, the audio information may comprise a substantially real-time transmission of audible sounds at the destination. In one embodiment, the audio information sent by the audio monitoring module 206 serves as an audio "preview" of the call for a listening agent. Alternatively, or in addition, in certain embodiments, the audio monitoring module 206 sends audio information from the agent to the destination 118 during or concurrent with the call status determination. The audio monitoring module 206 may actively send audio information to the agent. For example, in one embodiment, the audio monitoring module 206 preliminarily connects the call to the agent at the user terminal 102 so that the agent may interact with the call while the analysis module 204 analyzes the call with the call status determination. Therefore, the agent hears the audio from the call because the agent is connected to the call. The preliminary connection may be substantially similar to a full connection, except that the call has not been permanently or officially assigned to the agent. The audio monitoring module 206 may preliminarily connect an agent to a call on one of the communication lines active on the user terminal 102a at which the agent operates such as a call initiated at the user terminal 102a or a call transferred from another user terminal 102b.

In addition, the audio monitoring module 206 may passively send audio information to agent. Passively sending audio information to an agent as used herein means that the agent can hear the audio information received by the analysis module 204 during the establishing of the call, including voice audio from a person answering the call. The operation is passive because the agent is listening in to the call progress and may or may not eventually be assigned to the call once the call analysis is completed. For example, in one embodiment, the agent engages in a call at a user terminal 102 and the audio monitoring module 206 preliminarily connects the agent to the call by sending audio information from the called destination to the agent, allowing the agent to listen in to the call and prepare a suitable greeting.

In one embodiment, the audio monitoring module 206 sends audio information from a selected call to an available agent during the call status determination. The selected call may be a call having a highest likelihood of contacting a person. Furthermore, the audio monitoring module 206 may also send audio information for a plurality of calls to the agent. In this embodiment, the user terminal 102 may listen to the ringing on a plurality of communication lines and may select a line with which to exclusively interact either automatically or with a prompt from the agent at the user terminal.

In another embodiment, the audio monitoring module 206 preliminarily connects the call to an agent by establishing a provisional connection between the agent and the call, thus allowing an agent to hear portions of call signaling audio information for a call associated with that agent. In this embodiment, the audio monitoring module 206 may reside on a centralized dialer or call controller 112 and the audio monitoring module 206 may send the audio information to a user terminal 102 before the call is actually transferred, normally connected, and/or assigned to the agent. Then, if a subsequent conversation begins, the agent has already heard the greeting and may begin a natural call flow.

In one embodiment, the audio monitoring module 206 sends audio information from the call to two or more agents during the call status determination. The assignment module 208 may then assign the call to an available agent from the two or more agents. For example, the audio monitoring module 206 sends audio information from the call to an agent at a first user terminal 102a and to an agent at a second user terminal 102b. The agent at the second user terminal 102b hears a person answer the call and the agent may signal that he/she is available using an indicator such as a button on a keyboard. In response to the indicator, the assignment module 208 may assign to the agent at the second user terminal 102b. In such an embodiment, the two or more agents may be capable of speaking different languages and thus the agent hearing the called party answer in a particular language may signal that he/she is available to take the call in that particular language.

The assignment module 208 assigns the call to the agent. The assignment module 208 may passively assign the call to the agent by allowing the call to continue if the agent is already preliminarily connected to the call. In addition, the assignment module 208 may actively assign the call to the agent by transferring the call to the agent or user terminal 102 assigned to the agent if the call was not previously preliminarily connected. Alternatively, or in addition, the assignment module 208 may actively assign the call to the agent by updating status information to indicate that the particular call is being handled by the assigned agent. Therefore, in one embodiment, the assignment module 208 assigns a call by fully transferring, connecting, and updating status information, where the call was preliminarily assigned to the agent previously or the agent was able to monitor or input audio to/from the call.

The assignment module 208 may reside on the user terminal 102 to assign active calls on the communication lines of the user terminal 102. The assignment module 208 may also reside on a centralized dialer or call controller 112. In this embodiment, the assignment module 208 on the centralized dialer may transfer the call to the agent listening to audio cues from the call, thus permanently connecting the agent whereas the agent was previously simply preliminarily connected such as listening to audio portions of the call before the transfer. In one embodiment, the assignment module 208 assigns the call to the agent in response to the call status determination determining that a person answered the call at the destination 118.

Figure 3:
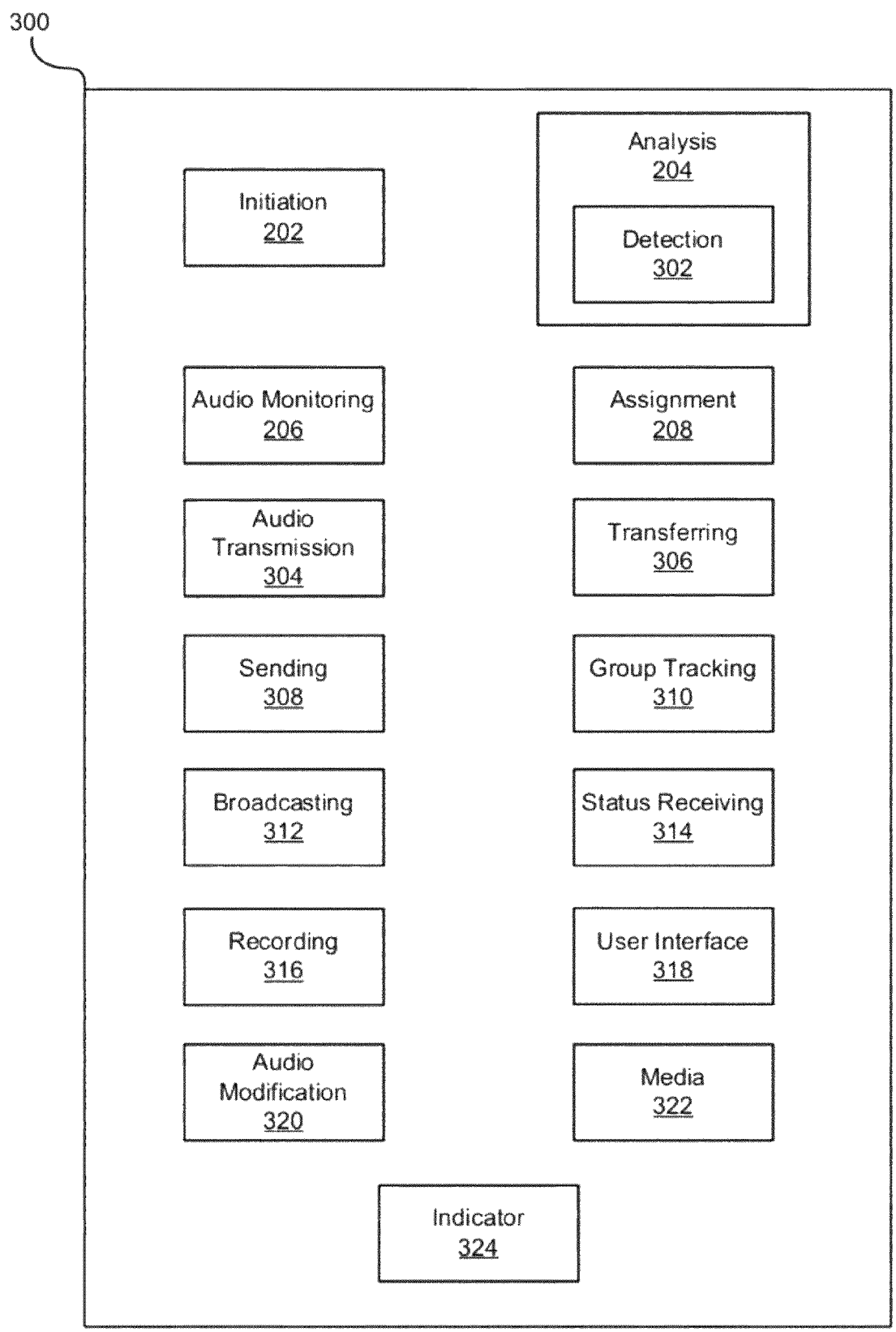
FIG. 3 is a detailed schematic block diagram illustrating another embodiment of an apparatus for automated call initiation.

FIG. 3 depicts another embodiment of an apparatus 300 for automated call initiation. The apparatus 300 may comprise one embodiment of the automated call apparatus 104 depicted in FIG. 1. The apparatus 300 includes the initiation module 202, the analysis module 204, the audio monitoring module 206, and the assignment module 208 which are substantially similar to those modules described above with relation to the apparatus 200 in FIG. 2. In the embodiment of FIG. 3, the analysis module 204 may include a detection module 302. Additionally, the apparatus 500 includes an audio transmission module 304, a transferring module 306, a sending module 308, a group tracking module 310, broadcasting module 312, a status receiving module 314, a recording module 316, a user interface module 318, an audio modification module 320, a media module 322, and an indicator module 324.

The detection module 302 determines a likelihood for each of the plurality of calls that each call is contacting a person during the call status determination to aid in determining which call an available agent should monitor (be listening to audio from the destination 118. The detection module 302 may analyze the audio of the call or utilize cues from various communication protocols as is known in the art.

The audio transmission module 304 sends audio information from the agent to the person during the call status determination. In one embodiment, transmitted audio information comprises audio information transmitted from the call, originating from the call, part of the call, and transmitted from the agent through the call. The transmitted audio information may include audio input directly from an agent preliminarily connected to the call. The transmitted audio information may also include audio input from an agent routed into the call. As with the audio monitoring module 206, the audio transmission module 304 may preliminarily connect the call to the agent at the user terminal 102a such that audio produced by the voice of the agent is sent to the destination 118. In this manner, the agent may interact with the call simultaneous with the analysis module 204 analyzing the call with the call status determination. Therefore, the agent may interact with the call (an operator of the destination 118) and the audio transmission module 304 may send audio information from the agent because the agent is both hearing audio from the destination and providing responsive audio in relation to the call.

In another embodiment, the audio transmission module 304 does not preliminarily connect the call to the agent by completely engaging the call with an agent, but by transmitting the audio from the agent to the destination 118 or through the call. In this embodiment, the audio transmission module 304 may reside on a centralized dialer or call controller 112 and the audio transmission module 304 may send the audio information from a user terminal 102 before the call is actually transferred/fully connected (assigned) to the agent at the user terminal 102.

The transferring module 306 transfers a second call on a second communication line to a second user terminal 102b in response to determining that the agent at the first user terminal 102a is unavailable to accept the second call and determining that a second agent operating the second user terminal 102b is available to accept the second call. The transferring module 306 may also receive a second call from a second user terminal 102b in response to a determination that the agent at the user terminal 102a is available to accept the second call. The transferring module 306 may transfer or receive a plurality of calls to or from a plurality of user terminals 102a,b.

Therefore, the transferring module 306 allows the full benefits of automated dialing algorithms and/or predictive dialing algorithms even when calls are initiated at each user terminal 102. The transferring module 306 may transfer calls to available user terminals 102b other than the user terminal 102a from which the call originated.

For example, a first terminal 102a initiated a secondary call that rings while the agent is still on a primary call. A second terminal 102b initiated a secondary call and the secondary call is busy leaving the agent at the second terminal 102b ready for another call. The transferring module 306 transfers the secondary call from the first user terminal 102a before the called party says "hello." The agent at the second terminal 102b hears the "hello" and is able to respond naturally and quickly. Had the called party said "hello" during or just before this transfer was complete, a pause would have occurred and the called party may have detected that the call was not natural. Although this pause may at times occur, this pause will occur much less frequently than when a transfer is required for all calls after the calls reach a person, as it is in conventional centralized systems.

In one embodiment, the transferring module 306 resides on the user terminal 102 and the user terminals 102a,b operate with peer-to-peer functionality. In this embodiment, the transferring module 306 may send or receive transfer requests. In another embodiment, the transferring module 306 resides on the call controller 112 and a centralized transferring module 306 handles transfers for all user terminals 102a,b. The transferring module 306 may base transfer determination on group information, which describes the call statuses for the lines on each user terminal as described below.

In some embodiments, the transferring module 306 is implemented through existing transferring mechanisms such as SIP transfers, flash-hook transfers, PBX transfers, PRI transfers, and the like.

The sending module 308 sends terminal call status from the user terminal 102a to a call controller 112. Terminal call status may include the call statuses such as busy, ringing, answering machine/voice mail, and conversation, for calls on each line of a user terminal 102a. Terminal call status may also include the status of each line such as whether the line is active or inactive and the length of time spent on any ongoing calls. The sending module 308 may send call status and terminal call status to the call controller 112 at any time. For example, the sending module 308 may send call status periodically at a predetermined time interval. In addition, the sending module 308 may send call status when a particular event occurs such as when a call is ringing, or when a call encounters a busy signal.

The sending module 308 may be implemented using conventional node to node communication mechanisms known in the art such as XML messages transmitted through TCP/IP packets.

The group tracking module 310 receives group information from a plurality of user terminals 102a,b. The group information may comprise terminal call statuses from a plurality of user terminals 102a,b acting as a group. Group information may also include group identification information, project identification information, call identification information, skill-set information for intelligent routing, Automatic Call Distribution ("ACD") information decision (both factors in determining decisions and results of decisions), user terminal identification information, line identification information, customer identification information, date and time information (at a message level or specific to any information within the message), unique identifiers to associate calls (or other processes) with a record in an external data system, and any other information as required by the group tracking module 310. Group information may also track the transfer of calls, track requests for call transfers, track the status of call transfers, or assist in any other way with the call transfer logic and mechanism.

This data in any combination or sub-set thereof, may be transmitted separately or as part of other data transmissions. In one embodiment, the group tracking module 310 resides on the call controller 112 and the call controller 112 may coordinate with the assignment module 208 to assign a plurality of calls to agents for the plurality of user terminals 102a,b based on the group information. The group tracking module 310 may be implemented on and/or stored within a database 114 in communication with the call controller 112 as is known in the art. In one embodiment, each user terminal 102 writes information about the status of the user terminal 102 and reads information about the status of other user terminals 102 to a centralized database or to separate storage maintained by each user terminal 102.

The group tracking module 310 may also reside on each user terminal 102 such as in a peer-to-peer environment. Moreover, the group tracking module 310 may receive group information using conventional node to node communication mechanisms known in the art. In one embodiment, the group tracking module 310 implements a directory service that allows a user terminal 102 to locate another user terminal 102. The directory service may be implemented using DNS or other existing directory technologies. This information may also be pulled from another company directory such as the CRM solution.

The broadcasting module 312 broadcasts terminal call status from the user terminal 102 to one or more additional user terminals 102. In a preferred embodiment, the broadcasting module 312 resides on each user terminal 102 to share terminal call status information with every other user terminal 102. In this embodiment, the user terminals 102 may operate in a peer-to-peer environment and may use information regarding every other terminal 102 for call transferring decisions. Furthermore, the broadcasting module 312 may broadcast terminal call status information using conventional node to node communication mechanisms known in the art. In addition, the broadcasting module 312 may broadcast terminal call status to all user terminals 102, or send terminal call status to a single user terminal 102 in a chain which then sends the information on to another user terminal 102 in the chain.

In one embodiment, the status receiving module 314 receives terminal call status information from the one or more additional user terminals 102 and maintains group information comprising terminal call statuses for each user terminal 102. In a preferred embodiment, the status receiving module 314 resides on the user terminal 102. Furthermore, the group information maintained by the status receiving module 314 at each user terminal 102 may be substantially similar to the group information described above in relation to the group tracking module 310. The status receiving module 314 may store and maintain group information using a conventional database in communication with the user terminal 102 or other data storage devices known in the art.

The recording module 316 marks the result of each call and records it in a database or other storage medium. The conventional process of result recording, as it is known in the art, is performed manually by the agent in manual dialing and automatically by the dialer in automatic or predictive dialing. However, the recording module 316 is capable of recording the results faster than an agent and does not interfere with agent productivity. In one embodiment, the recording module 316 resides at the user terminal 102 thus allowing the agent to hear the call progress while the recording module 316 at the user terminal 102 still automatically records the call results. Thus, the agent has the advantage of initiating calls in a natural way and the contact center has the advantage associated with automatically recording call results.

The user interface module 318 displays real-time line and call information to the agent at the user terminal 102. The user interface module 318 may display text, icons, sounds, or other output to the agent to communicate the status of lines and other call control and application information. In one embodiment, a series of icons on a user interface device 106 such as a screen, represent the lines for the user terminal 102. An agents is able to visually see the status of call progress on multiple lines. The icons let the agent know before a call is transferred to or from another user terminal 102. The user interface module 318 assists an agent as he/she prepares to accept a sudden inbound transfer from another user terminal 102. The user interface module 318 may also allow an agent to know if an answered call at a line on his/her user terminal 102 has been transferred or needs attention. The user interface module 318 may also display messages from supervisors or the display may be controlled by supervisors as needed. The user interface module 318 may be implemented using graphical user interface applications or programming known in the art.

The audio modification module 320 replaces call signaling audio with other audio media. Agents in a contact center become quickly fatigued from hearing ringing, busy signals, and other call related sounds. The audio modification module 320 allows agents or administrators to replace these sounds with music or other more pleasant sounds to reduce fatigue while still communicating specific call status or progress information. In one embodiment, sounds are selected by the agent to replace common signaling sounds such as music for ringing, a chime for a busy signal, and the like.

In one embodiment, the audio modification module 320 lowers the volume of sounds based upon the state of the call like ringing, music, tones, indicators, and the like. The audio modification module 320 may implement selective volume lowering by detecting the state of the call and significantly lowering the volume of the media sent to the agent when the call state indicates that a conversation is not in progress. The audio modification module 320 may likewise return the volume to a normal level when the call state indicates that a conversation is in progress.

The media module 322 sends and receives additional media for management and other purposes. For example, a media module 322 at a user terminal 102 may send a media stream that includes any combination of audio in progress, video from a camera, video from the user's screen, text messages, text representations of call progress or application information, video from other sources, audio from other sources, or any other media from other sources. These streams may be used in the management of contact center agents.

For example, a contact center supervisor may collect the streams from all agents under their supervision for real-time remote management of all aspects of an agent's progress. The media streams may be used to enable management conversations in between or during calls. Media streams may be used in a conference mode or a coaching mode such as a situation in which the called party can hear the agent and not the supervisor. One of ordinary skill in the art realizes that the media module 322 may send media streams for communications purposes other than management.

The indicator module 324 affects the predictive dialing algorithm's decisions by providing indicators. Indicators are user input that is collected through a user input device 106 such as a keyboard, keypad, voice recognition, and the like, and sent to the implementation that is processing the predictive algorithm such as the initiation module 202. These indicators may then be used to affect the algorithm's decision about when a call is initiated. For example, a user indicator called "long call" might be sent by an agent to indicate that the call is running longer than expected. Another example indicator may be "almost done." Both of these examples may be factored into the predictive dialing algorithm to help an automatic dialing system 100 determine when to begin initiation of new calls for a particular agent or a group of user terminals 102a,b.

Figure 4:
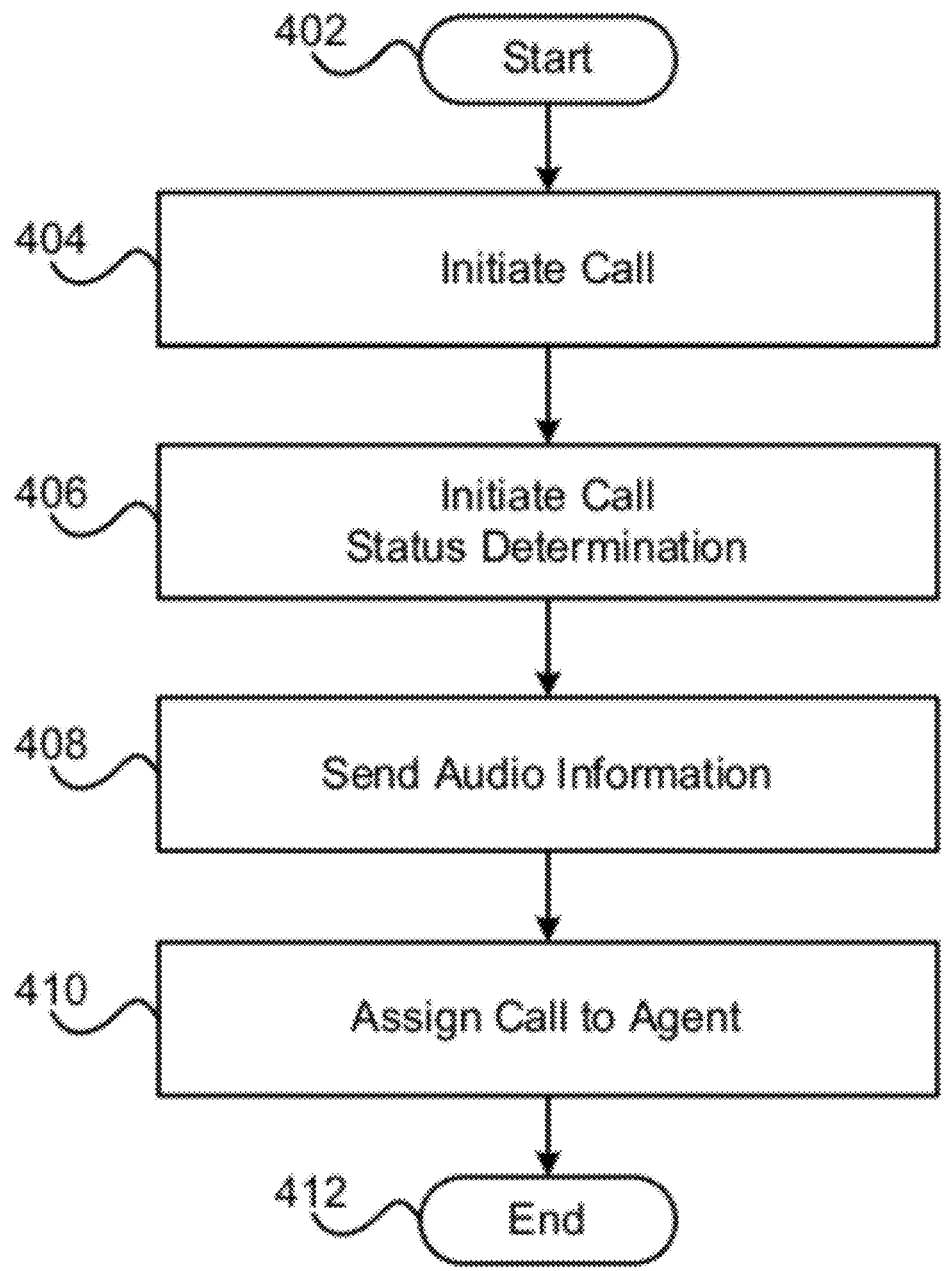
FIG. 4 is a schematic flow chart diagram illustrating one embodiment of a method for automated call initiation.

FIG. 4 depicts one embodiment of a method 400 for automated call initiation. The method 400 starts 402 when the initiation module 202 initiates 404 a call to a destination 118 using a first communication line. The analysis module 204 then initiates 406 a call status determination that determines when a person answers the call at the destination 118a. During the call status determination, the audio monitoring module 206 sends 408 audio information from the call to an agent. The assignment module 208 then assigns 410 the call to the agent in response to the call status determination determining that the person answered the call at the destination 118. Then, the method 400 ends 412.

Figure 5:
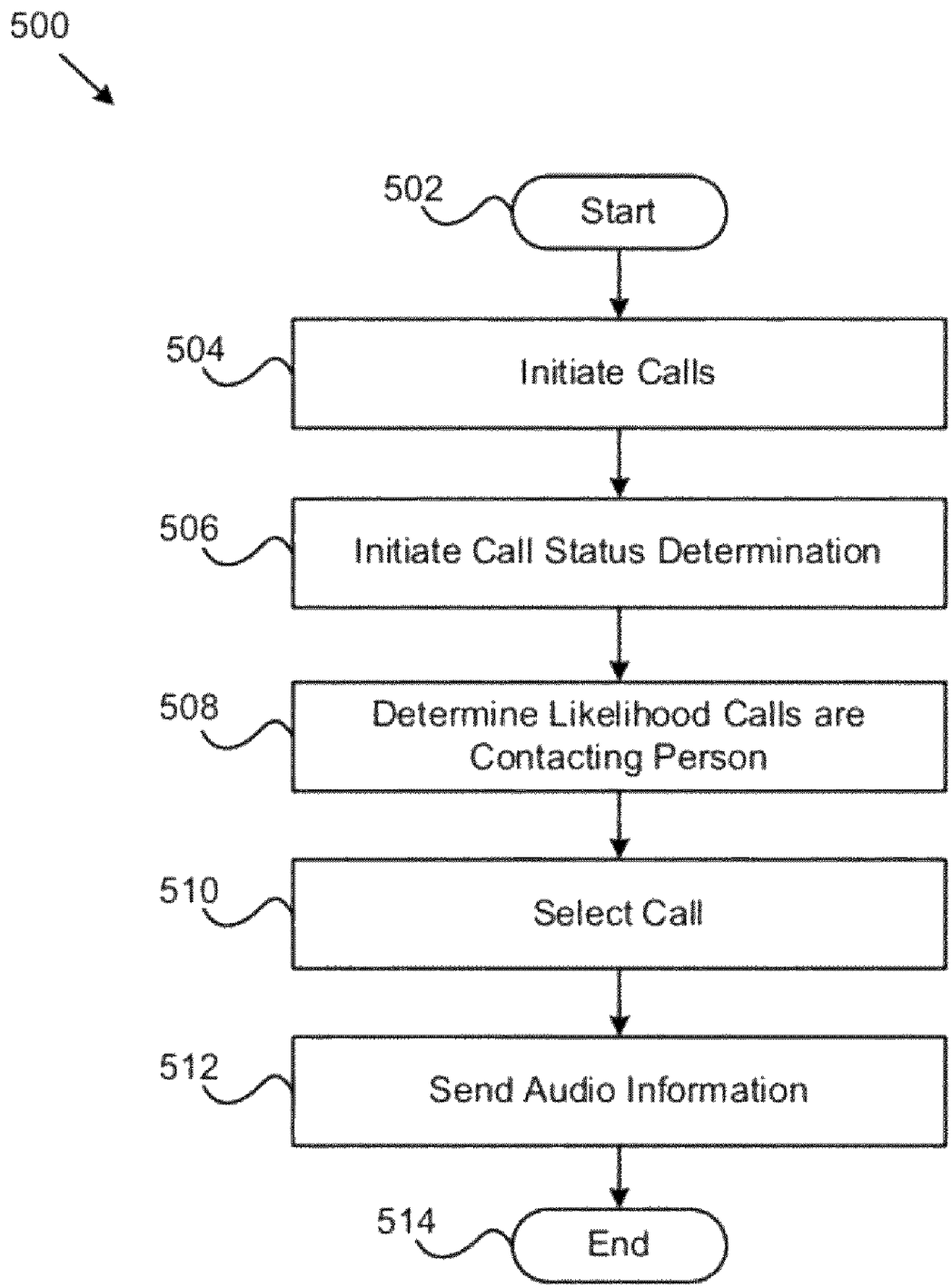
FIG. 5 is a schematic flow chart diagram illustrating another embodiment of a method for automated call initiation.

FIG. 5 depicts another embodiment of a method 500 for automated call initiation. The method 500 starts 502 when the initiation module 202 initiates 504 a plurality of calls. The analysis module 204 then initiates 506 a call status determination for each of the plurality of calls. The detection module 302 determines 508 a likelihood for each of the plurality of calls that each call is contacting a person during the call status determination. The analysis module 204 selects 510 a call with the highest likelihood of contacting a person. Then, the audio monitoring module 206 sends 512 audio information from a destination 118 of the selected call to an available agent during the call status determination and the method 500 ends 514.

Figure 6:
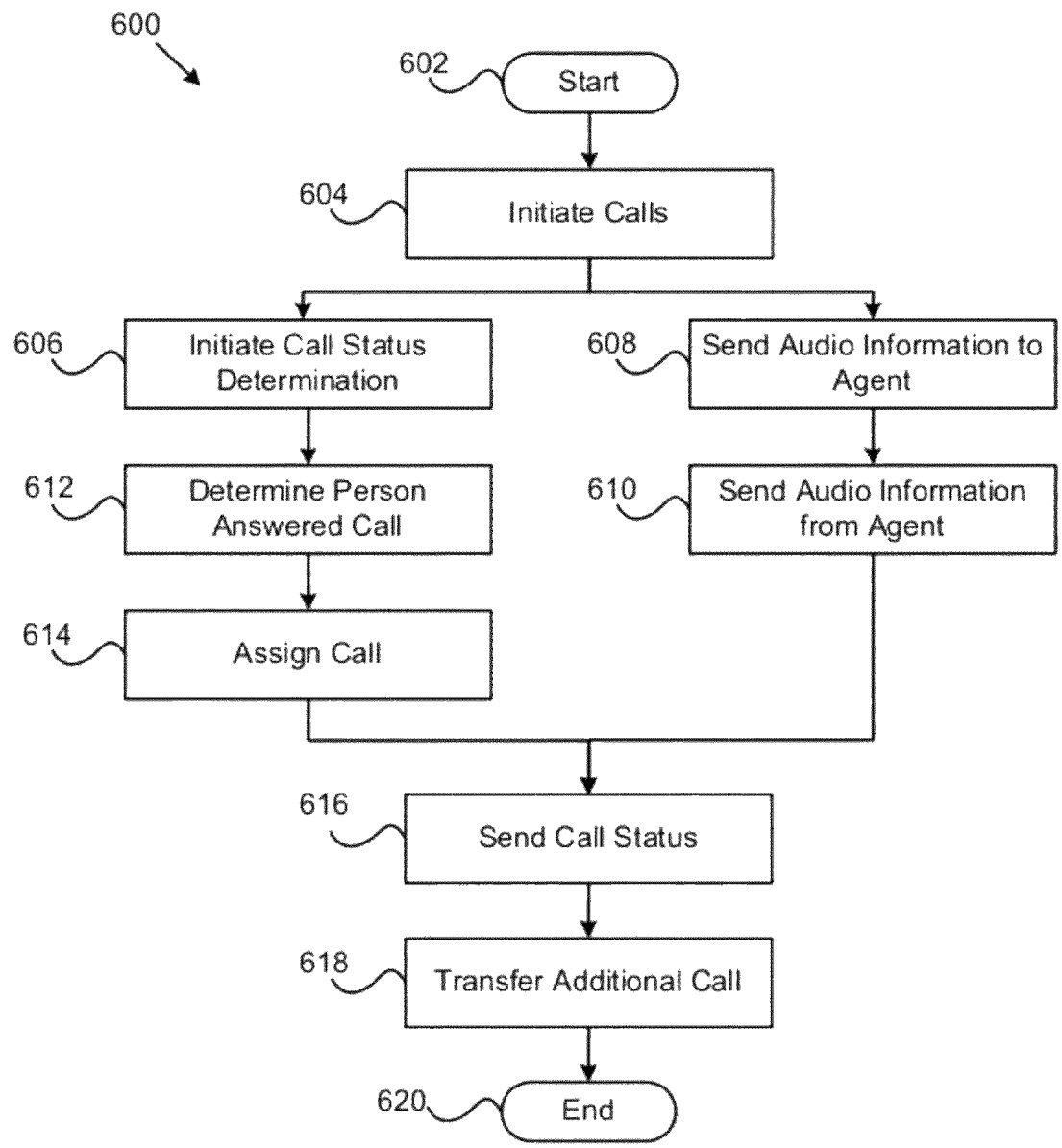
FIG. 6 is a detailed schematic flow chart diagram illustrating one embodiment of a method for automated call initiation.

FIG. 6 depicts another embodiment of a method 600 for automated call initiation. The method 600 starts 602 when the initiation module 202 initiates 604 a plurality of calls to a plurality of destinations 118a,b, 120 using a plurality of communication lines. For example, the initiation module 202 at a first user terminal 102a may create two new instances of a soft-phone session and initiate a new call with each session using destination numbers or addresses provided by a call controller 112.

Next, the analysis module 204 initiates 606 a call status determination for each call that determines whether a person answers each call at the destination 118. For example, the analysis module 204 determines that the first call is ringing and that the second call has encountered a busy signal. In addition, an agent may see, through the user interface module 318, that the initiation module 202 has initiated two calls and the progress and status of those two calls.

At the same time that the analysis module 204 initiates 606 the call status determination, the audio monitoring module 206 sends 608 audio information from the destination 118 of the selected call to an agent at the first user terminal 102a. In addition, in one embodiment, the audio transmission module 304 also concurrently sends 610 audio information from the agent to the person for the selected call during the call status determination. In one embodiment, the audio modification module 320 may lower the ringing call's audio during the ringing state of the call. The audio modification module 320 may alternatively substitute the ringing as music if preferred by the agent. During this time, the analysis module 204 determines 612 that a person is answering the call at the destination 118. The person at the destination 118 says "hello" and the agent hears this greeting. The agent is then able to begin the call in a very natural manner.

While the agent is monitoring/listening to the call, the assignment module 208 assigns 614 the call to the agent, in response to the call status determination determining that the person answered the call at the destination 118. Then, the sending module 308 sends 616 call status information from the user terminal 102 to a call controller 112.

Next, in one embodiment, the transferring module 306 transfers 614 a second call on a second communication line to a second user terminal 102b in response to determining that the agent at the first user terminal 102a is still engaged in the call and that a second agent is available at a second user terminal 102b. Then, the method 600 ends 620. For example, the agent at the first user terminal 102a may still be engaged in conversation on the first call while an agent at a second user terminal 102b may have just finished a call. Since the agent at the second user terminal 102b is now ready, the second call is transferred during the ringing phase. The second agent hears the last ring, hears the "hello", and begins the call in a natural manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automated call initiation, the method comprising:
   initiating a call to a destination automatically using a first communication line;
   initiating a call status determination that automatically determines when the call is answered at the destination and when a person answers the call;
   during the call status determination, sending audio information to an agent, the audio information generated by a microphone at the destination, the audio information comprising live human voice audio information generated by a person answering the call at the destination; and
   assigning the call to the agent, the agent concurrently receiving the audio information during the call status determination, the call assigned to the agent concurrent with the call status determination determining that the person answered the call at the destination.

2. The method of claim 1, further comprising sending audio information from the agent to the person at the destination during the call status determination.

3. The method of claim 2, wherein the call status determination incorporates a verbal response from the agent in determining that the person answered the call at the destination.

4. The method of claim 1, further comprising sending audio information from the call to two or more agents during the call status determination, the call assigned to an available agent from the two or more agents.

5. The method of claim 1, further comprising,
initiating a plurality of calls;
initiating a call status determination for each of the plurality of calls;
during the call status determination, determining a likelihood for each of the plurality of calls that each call is contacting a person; and
during the call status determination, sending audio information from a destination of a selected call to an available agent, the selected call comprising a call with the highest likelihood of contacting a person.

6. The method of claim 1, wherein a user terminal initiates the call, the user terminal comprising two or more communication lines and operated by an agent.

7. The method of claim 6, wherein the user terminal comprises an analysis module configured to execute the call status determination.

8. The method of claim 6, further comprising initiating a second call on the user terminal using a second communication line and transferring the second call to a second user terminal in response to determining that the agent at the first user terminal is unavailable to accept the second call and determining that a second agent operating the second user terminal is available to accept the second call.

9. The method of claim 6, further comprising sending terminal call status from the user terminal to a call controller, the call controller configured to receive group information and assign a plurality of calls to agents for a plurality of user terminals based on the group information, the group information comprising terminal call statuses from the plurality of user terminals.

10. The method of claim 6, further comprising broadcasting terminal call status from the user terminal to one or more additional user terminals, the user terminal configured to receive terminal call statuses from the one or more additional user terminals and maintain group information comprising terminal call statuses for each user terminal.

11. An apparatus for automated call initiation using Call Progress Analysis (CPA), the apparatus comprising:
an initiation module configured to automatically initiate an outbound call to a destination using a first communication line;
an analysis module configured to initiate a Call Progress Analysis ("CPA") that automatically determines when the outbound call is answered at the destination and when a person answers the call;
an audio monitoring module configured to send audio information to an agent, the audio information generated by a microphone at the destination concurrent with the CPA, the audio information comprising live human voice audio information generated by a person answering the call at the destination;
an audio transmission module configured to send audio information from the agent to the person concurrent with the CPA; and
an assignment module configured to assign the outbound call to the agent, the agent concurrently receiving the audio information during the call status determination, the call assigned to the agent concurrent with the CPA determining that the person answered the outbound call at the destination, wherein the CPA incorporates a verbal response from the agent in determining that the person answered the call at the destination.

12. The apparatus of claim 11, wherein the audio monitoring module sends audio information to two or more agents concurrent with the CPA and the two or more agents posses multi-lingual language capabilities such that one of the two or more agents hearing the called party answer in a particular language signals availability to take the call in the language of the person answering at the destination.

13. The apparatus of claim 11, further comprising,
the initiation module configured to initiate a plurality of calls;
the analysis module configured to initiate a CPA for each of the plurality of calls;
the analysis module further comprising a detection module configured to determine a likelihood for each of the plurality of calls that each call is contacting a person during the CPA; and
the audio monitoring module configured to send audio information from a destination of a selected call to an available agent during the CPA, the selected call comprising a call with a highest likelihood of contacting a person.

14. The apparatus of claim 11, wherein the initiation module and the analysis module reside on a user terminal, the user terminal comprising two or more communication lines and operated by an agent.

15. The apparatus of claim 14, further comprising a transferring module configured to transfer a second call on a second communication line to a second user terminal in response to determining that the agent at the first user terminal is unavailable to accept the second call and determining that a second agent operating the second user terminal is available to accept the second call.

16. The apparatus of claim 14, further comprising a sending module configured to send terminal call status from the user terminal to a call controller, the call controller comprising a group tracking module configured to receive group information, the call controller further configured to assign a plurality of calls to agents for a plurality of user terminals based on the group information, the group information comprising terminal call statuses from the plurality of user terminals.

17. The apparatus of claim 14, further comprising a broadcasting module configured to broadcast terminal call status from the user terminal to one or more additional user terminals, the user terminal further comprising a status receiving module configured to receive terminal call statuses from the one or more additional user terminals and maintain group information comprising terminal call statuses for each user terminal.

18. A system for automated call initiation, the system comprising:
a network configured to communicate data between a plurality of devices;
a call controller in communication with the network;
a user terminal in communication with the network, the user terminal comprising two or more communication lines and operated by an agent, the user terminal comprising:
an initiation module configured to automatically initiate a call to a destination using a first communication line;

an analysis module configured to initiate a call status determination that automatically determines when the call is answered at the destination and when a person answers the call;

an audio monitoring module configured to send audio information to an agent, the audio information generated by a microphone at the destination during the call status determination, the audio information comprising real-time live human voice audio information generated by a person answering the call at the destination;

an audio transmission module configured to send audio information from the agent to the person during the call status determination;

an assignment module configured to assign the call to the agent, the agent concurrently receiving the audio information during the call status determination, the call assigned to the agent concurrent with the call status determination determining that the person answered the call at the destination;

the initiation module further configured to automatically initiate a second call to a second destination by way of a second communication line, the second call distinct from the outbound call;

the analysis module further configured to automatically initiate a second call status determination that determines when a person answers the second call at the second destination;

the audio monitoring module further configured to send audio information, during the second call status determination, from the second destination to one of the agent and a second agent, the audio information comprising live human voice audio information generated by a person answering the second call at the second destination; and the assignment module further configured to assign the second call to one of the agent and the second agent in response to determining that said agent is available to receive the second call and the second call status determination determining that the person answered the call at the second destination.

19. The system of claim 18, wherein the user terminal further comprises a transferring module configured to receive a second call from a second user terminal in response to a determination that the agent at the user terminal is available to accept the second call.

20. The system of claim 18, wherein the user terminal further comprises a sending module configured to send terminal call status to the call controller, the call controller comprising a group tracking module configured to receive group information, the call controller configured to assign a plurality of calls to agents for the plurality of user terminals based on the group information, the group information comprising terminal call statuses from a plurality of user terminals.

21. A method for automated call initiation, the method comprising:
   initiating a call to a destination automatically using a first communication line;
   initiating a call status determination that automatically determines whether to assign the call to an agent;
   during the call status determination, sending audio information to the agent, the audio information generated by a microphone at the destination, the audio information comprising live human voice audio information generated by a person answering the call at the destination; and
   assigning the call to the agent, in response to the call status determination determining to assign the call to an agent, wherein the call status determination incorporates a verbal response from the agent in determining whether to assign the call to an agent.

22. The method of claim 21, further comprising sending the verbal response from the agent to the person at the destination during the call status determination.

23. The method of claim 21, further comprising sending audio information from the call to two or more agents during the call status determination, the call assigned to an available agent from the two or more agents, and wherein the call status determination incorporates a verbal response from one or more of the two or more agents in determining whether to assign the call to an agent.

* * * * *